(12) United States Patent
Guzik

(10) Patent No.: US 9,841,865 B2
(45) Date of Patent: Dec. 12, 2017

(54) IN-VEHICLE USER INTERFACES FOR LAW ENFORCEMENT

(71) Applicant: WHP Workflow Solutions, LLC, North Charleston, SC (US)

(72) Inventor: Thomas Guzik, Edina, MN (US)

(73) Assignee: WHP Workflow Solutions, LLC, North Charleston, SC (US)

( * ) Notice: Subject to any disclaimer, the term of this patent is extended or adjusted under 35 U.S.C. 154(b) by 231 days.

(21) Appl. No.: 14/732,601

(22) Filed: Jun. 5, 2015

(65) Prior Publication Data

US 2016/0358017 A1 Dec. 8, 2016

(51) Int. Cl.
| | |
|---|---|
| *H04N 7/18* | (2006.01) |
| *G06F 3/048* | (2013.01) |
| *G06K 9/00* | (2006.01) |
| *G06Q 10/00* | (2012.01) |

(52) U.S. Cl.
CPC .......... *G06F 3/048* (2013.01); *G06K 9/00832* (2013.01); *G06Q 10/00* (2013.01); *G06K 9/00845* (2013.01)

(58) Field of Classification Search
IPC ...................................................... G06F 3/048
See application file for complete search history.

(56) References Cited

U.S. PATENT DOCUMENTS

| | | | | |
|---|---|---|---|---|
| 6,188,939 | B1* | 2/2001 | Morgan | B60Q 1/2611 340/815.69 |
| 2006/0055521 | A1* | 3/2006 | Blanco | H04N 7/188 340/441 |
| 2015/0057838 | A1* | 2/2015 | Scholl | H04W 4/046 701/2 |

* cited by examiner

*Primary Examiner* — Tracy Y Li
(74) *Attorney, Agent, or Firm* — Han Santos, PLLC

(57) ABSTRACT

User interfaces may be used by a law enforcement officer to communicate information to and obtain feedback from a person that is held in a secure holding area of a law enforcement vehicle. The user interfaces may be presented via hardware interfaces in the law enforcement vehicle and a computing device. The computing device may receive a request to present a user interface to a person in the secure holding area. Subsequently, the user interface for the person may be generated based on contextual information from one or more sources. These sources may include an input provided to the computing device by a law enforcement officer, an input received from a network operations center, or an input obtained from an analysis of images or videos from a camera in the law enforcement vehicle. The user interface is then presented to the person in the secure holding area.

20 Claims, 6 Drawing Sheets

IN-VEHICLE USER INTERFACES FOR LAW ENFORCEMENT

BACKGROUND

Law enforcement vehicles are commonly equipped with mobile data terminals that enable law enforcement officers to obtain information on persons and vehicles of interests, communicate with dispatch centers and other officers, and create incident reports. However, such systems are generally not designed for use by persons that law enforcement officers interact with as the law enforcement officers perform their duties. Thus, despite the existence of computation and multimedia presentation resources in law enforcement vehicles, such resources do not provide direct benefits to the citizens that are served by the law enforcement officers.

SUMMARY

Described herein are techniques for providing in-vehicle user interfaces to a person that is contacted by a law enforcement officer. The person may be a member of the community, an eyewitness, or a suspect that is arrested by the law enforcement officer. The in-vehicle user interfaces may be presented by an in-vehicle information device. The in-vehicle information device may provide user interfaces that include video via a display device and/or audio via an audio device to a person that is in a secure holding area (e.g., backseat, rear passenger compartment, etc.) of a law enforcement vehicle. Furthermore, the in-vehicle information device may also include a first input device that is controllable by the law enforcement officer from an area of the vehicle that is intended for use by the law enforcement officer. The input device may include a touch display screen, a keyboard, a pointing device, and/or so forth. The in-vehicle information device may further include a second input device (e.g., a touch screen) that is accessible to the person in the secure holding area.

The in-vehicle user interfaces may provide services to the person in the secure holding area. The services may be provided based on contextual information supplied by the law enforcement officer or contextual information provided by a dispatch network operations center that dispatched the law enforcement officer. In some instances, a law enforcement officer may use an in-vehicle user interface to disseminate information regarding legal rights to an arrested suspect. In other instances, an in-vehicle user interface may be used by the law enforcement officer to solicit information regarding an incident from a person. In further instances, an in-vehicle user interface provided by the in-vehicle information device may present distractions that calm or comfort a person that is held in the secure holding area.

In some instances, the in-vehicle information device may generate data regarding the person that is held in the secure holding area. For example, the in-vehicle information device may include cameras that monitor the body movements or facial expressions of the person held in the secure holding area. In turn, the body movements or facial expressions of the person may be analyzed by an on-board analytic engine of the in-vehicle information device or an analytic engine at a network operations center to detect suspicious behavior by the person.

The in-vehicle information device may tag the collected data with metadata. The collected data may include images or camera footage captured by the cameras, information supplied by persons using in-vehicle user interfaces, and/or information supplied to the in-vehicle information device by a law enforcement officer. The metadata may be used to index, sort, and organize the collected data with respect to incidents, time, case numbers, event identifiers, and/or so forth for subsequent analysis and retrieval.

In at least one embodiment, a request to present a user interface to a person in a secure holding area of the law enforcement vehicle may be received. Subsequently, the user interface for the person may be generated based on the request. The user interface is then presented to the person in the secure holding area of the law enforcement vehicle.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
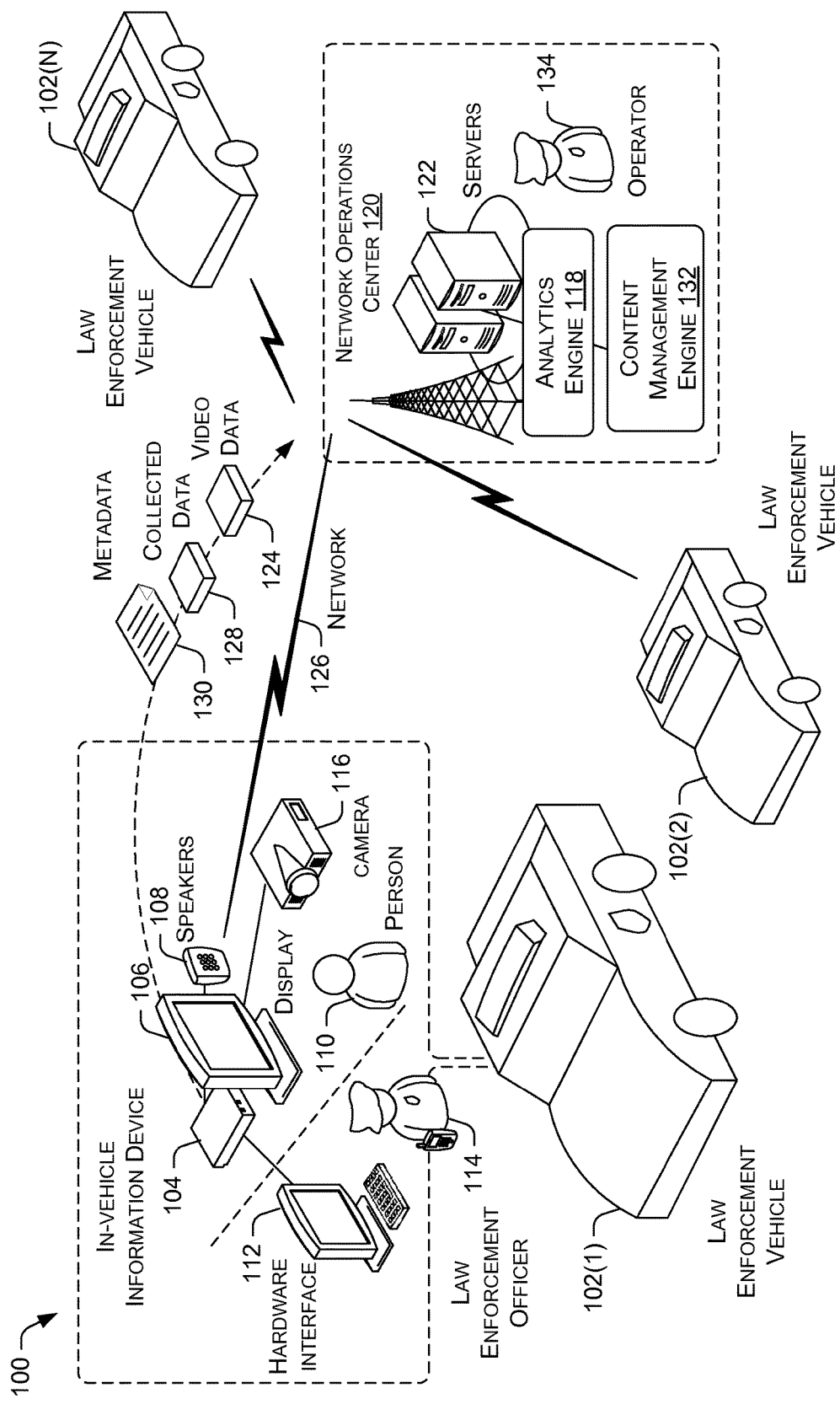
FIG. 1 illustrates an example architecture for implementing law enforcement in-vehicle user interfaces.

This disclosure is directed to techniques for providing in-vehicle user interfaces to a person that is contacted by a law enforcement officer. The person may be a member of the community, an eyewitness, or a suspect that is arrested by the law enforcement officer. The in-vehicle user interfaces may be presented by an in-vehicle information device. The in-vehicle information device may provide video via a display device and/or audio via an audio device to a person that is in a secure holding area (e.g., backseat, rear passenger compartment, etc.) of a law enforcement vehicle. Furthermore, the in-vehicle information device may also include a first input device that is controllable by the law enforcement officer from an area of the vehicle used by the law enforcement officer. The input device may include a touch display screen, a keyboard, a pointing device, and/or so forth. The in-vehicle information device may further include a second input device (e.g., a touch screen) that is accessible to the person in the secure holding area.

The in-vehicle user interfaces may provide services to the person in the secure holding area. The services may be provided based on contextual information supplied by the law enforcement officer or contextual information provided by a dispatch network operations center that dispatched the law enforcement officer. For example, the law enforcement officer may select an in-vehicle user interface based on contextual information such as reasons for which the law enforcement officer is interacting with the person, behavior of the person during the interaction, and/or so forth. In another example, contextual information from the dispatch center that are used to select an in-vehicle user interface may include an age of the person, prior criminal or arrest record of the person, propensity for specific behaviors by the person, medical conditions of the person, and/or so forth.

In some instances, a law enforcement officer may use an in-vehicle user interface to disseminate information regarding legal rights to an arrested suspect, such as a suspect that is unable to understand the language spoken by the law enforcement officer. In these instances, the disseminated information may serve to alleviate the anxiety of the person. In other instances, an in-vehicle user interface may be used by the law enforcement officer to solicit information regarding an incident from a person. In further instances, an in-vehicle user interface provided by the in-vehicle information device may present distractions to calm or comfort a person that is held in the secure holding area. For example, the person may be a lost child that is waiting to be picked up by a parent.

In additional instances, the in-vehicle information device may generate data regarding the person that is held in the secure holding area. For example, the in-vehicle information device may include cameras that monitor the body movements or facial expressions of the person held in the secure holding area. In turn, the body movements or facial expressions of the person may be analyzed by an on-board analytic engine of the in-vehicle information device or an analytic engine at a network operations center to detect suspicious behavior by the person.

In various embodiments, the in-vehicle information device may tag collected data with metadata. The collected data may include camera footage captured by the cameras, information supplied by persons using in-vehicle user interfaces, and/or information supplied to the in-vehicle information device by a law enforcement officer. The metadata may be used to index, sort, and/or organize the collected data with respect to incidents, time, case numbers, event identifiers, etc. for subsequent analysis and retrieval. In some instances, the collected data may be indexed, sorted, and/or organized at a network operations center. In such instances, the collected data and the metadata may be encrypted with an encryption key or signed with a digital signature to ensure the lack of tampering during the transfer of the collected data and the metadata from the in-vehicle information device to the network operations center. In this way, the lack of tampering may ensure that proper chain of custody is maintained for evidentiary purposes.

The techniques may enable a law enforcement officer to communicate information to and obtain feedback from a person that is held in a secure holding area of a law enforcement vehicle. The information may be used to alleviate the anxiety or fear of a person that is detained or arrested. The techniques may also enable a law enforcement officer to provide distractions that calm or comfort individuals being contacted by the law enforcement officer. Accordingly, the in-vehicle user interfaces may be used by law enforcement officers to foster trust, increase public safety, and improve relations with community members. Example implementations are provided below with reference to the following figures.

Example Architecture

FIG. 1 illustrates an example architecture 100 for implementing law enforcement in-vehicle user interfaces. The architecture 100 may include law enforcement vehicles 102(1)-102(N). Each of the law enforcement vehicles may be equipped with an in-vehicle information device. For example, the law enforcement vehicle 102(1) may be equipped with an in-vehicle information device 104. The in-vehicle information device 104 may be connected to a display device 106 and audio speakers 108 that are accessible by a person 110 that is in a secure holding area (e.g., backseat) of the law enforcement vehicle. The vehicle information device 104 may be mounted at any location in the law enforcement vehicle that is not accessible from the secure holding area of the vehicle. In various embodiments, the secure holding area may be separated from the remaining area of the law enforcement vehicle 102(1) by a protective barrier, in which the protective barrier also protect the display device 106 and audio speakers 108 from vandalism. In some embodiments, the display device 106 may be a touch screen device that enables a person in the secure holding area to provide inputs to the in-vehicle information device 104.

The in-vehicle information device 104 may be further connected to hardware interface 112 that is used by a law enforcement officer 114 that operates the law enforcement vehicle 102(1). For example, the hardware interface 112 may be mounted proximate to the driver seat of the law enforcement vehicle 102(1). The hardware interface 112 may include a data output device (e.g., visual display, audio speakers), and one or more data input devices. The data input devices may include, but are not limited to, combinations of one or more of keypads, keyboards, mouse devices, touch screens, microphones, speech recognition software, and any other suitable devices or other electronic/software selection methods.

The in-vehicle information device 104 may include hardware and software that enables the unit to generate in-vehicle user interfaces that are presented by the display device 106, the audio speakers 108, and/or the hardware interface 112. In various embodiments, the in-vehicle information device 104 may be a smartphone, a tablet computer, a networked computer, an embedded computer, or any other computing device that is capable of receiving input, processing the input based on data stored in the device, and generating output for presentation.

The in-vehicle user interfaces may be used by the law enforcement officer 114 to communicate with the person in the secure holding area. The law enforcement officer 114 may use the hardware interface to select the appropriate in-vehicle user interfaces. In some instances, the in-vehicle user interface may be a multimedia presentation that explains the legal rights of an arrested person, e.g., person 110. The in-vehicle user interface may be selected for presentation by the law enforcement officer 114 via the hardware interface 112 through an interface menu. In turn, the in-vehicle user interfaces may be presented to the person via the display device 106 and the audio speaker 108. Other information that may be disseminated in this manner may include information regarding the destination detention facility that the arrested person is being transported to, the criminal code that the person is alleged to have violated, and/or so forth.

In other instances, in-vehicle user interfaces that are generated by the in-vehicle information device 104 may include interactive user interfaces. Such interactive user interfaces may be used by the law enforcement officer to solicit information regarding an incident from a person of interest. For example, a person arrested for drunk driving may voluntarily take a mental agility test to prove that they are in fact sober. In another example, the person arrested for drunk driving may use the in-vehicle user interface to answer a series of questionnaires about the current mental state of the person.

The in-vehicle information device 104 may also present in-vehicle user interfaces that provide distractions to calm or comfort a person that is held in the secure holding area. The distractions may be include games, audio presentations (e.g., music), video presentations (e.g., animations), multimedia presentations (e.g., movies), and/or so forth. For example, the person may be a lost child that is waiting to be picked up by a parent, and a game may help the child pass the time. In another example, in-vehicle user interface may be used to provide soothing music and visual imagery to a distressed person.

In some instances, the in-vehicle information device 104 may include cameras 116 that monitor the body movements of the person held in the secure holding area. In turn, the body movements of the person may be analyzed by an on-board analytic engine of the in-vehicle information device 104 to detect suspicious behavior of the person. Alternatively, the body movements or facial expressions of the person may be analyzed by an analytic engine 118 at a network operations center 120 to detect suspicious behavior by the person. In some embodiments, the network operations center 120 may be part of a law enforcement agency or a private contractor that is offering services to the law enforcement agency. The analytic engine 118 may be implemented by servers 122 of the network operations center 120. The server 122 may include one or more central processing units (CPUs) that each has one or more cores. The servers 122 may be equipped with on board read only memory (ROM), e.g., a basic input/output system (BIOS), which manages boot up, random access memory (RAM), and one or more hard drives. Large arrays of storage, such as Redundant Array of Inexpensive Disks (RAID arrays) may be implemented for the servers 122.

The in-vehicle information device 104 may transmit video data 124 that captures the body movements or facial expressions of the person to the network operations center 120 via a network 126. The network 126 may be a local area network ("LAN"), a larger network such as a wide area network ("WAN"), a carrier network, or a collection of networks, such as the Internet. Protocols for network communication, such as TCP/IP, may be used to implement the network 126. The carrier network may provide telecommunication and data communication in accordance with one or more technical standards.

In other embodiments, the in-vehicle information device 104 may tag the collected data 128 with metadata 130. The collected data 128 may include information supplied by persons via an input device (e.g., a touch display, a touch pad, a keyboard, etc.) The collected data may further include information supplied to the in-vehicle information device 104 by the law enforcement officer 114, as inputted via the hardware interface 112. The in-vehicle information device 104 may generate the metadata 130 based on dispatch information, a vehicle location of the law enforcement vehicle 102(1), timestamp information, incident name, case number, event identifier, and/or so forth. The in-vehicle information device 104 may transmit the collected data 128 and the metadata 130 to the network operations center 120. In turn, the network operations center 120 may store such data in the servers 122. In some embodiments, a content management engine 132 on the servers 122 may use the metadata 130 to sort portions of the collected data 128 and aggregate such portions with other data pertaining to similar incidents, events, times, cases, and/or so forth. In this way, an operator 134 at the network operations center 120 may use specific queries to find details and information, so that such data may be retrieved from the servers 122.

Example Device Components

Figure 2:
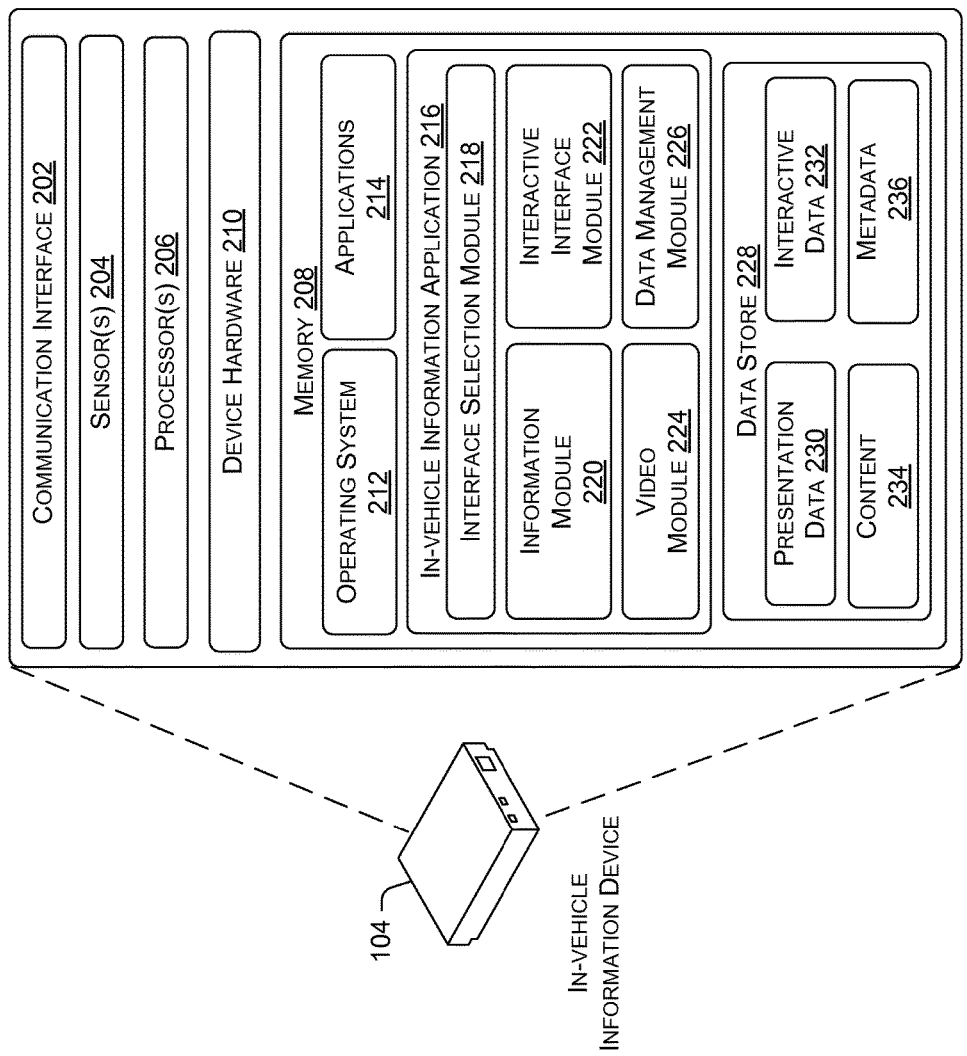
FIG. 2 is a block diagram showing various components of an in-vehicle information device that implement law enforcement in-vehicle user interfaces.

FIG. 2 is a block diagram showing various components of an in-vehicle information device 104 that implement law enforcement in-vehicle user interfaces. The in-vehicle information device 104 may be equipped with a communication interface 202, one or more sensors 204, one or more processors 206, and memory 208. The communication interface 202 may include wireless and/or wired communication components that enable the device to transmit or receive voice or data communication via the network 126, as well as other telecommunication and/or data communication networks. The sensors 204 may include a compass, an accelerometer, and/or a global positioning system (GPS) sensor. The compass, the accelerometer, and the GPS sensor may detect orientation, movement, and geolocation of the in-vehicle information device 104.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 210 may include other hardware that is typically located on a user device. For example, the device hardware 210 may include signal converters, antennas, modems, hardware decoders and encoders, graphic processors, a subscriber identity module (SIM) card slot, and/or the like that enable the in-vehicle information device 104 to execute applications and provide telecommunication and data communication functions.

The one or more processors 206 and the memory 208 of the in-vehicle information device 104 may implement an operating system 212, applications 214, and an in-vehicle information application 216. The operating system 212 may include components that enable the in-vehicle information device 104 to receive and transmit data via various interfaces (e.g., user controls, communication interface 202, and/or memory input/output devices). The operating system 212 may also process data using the one or more processors 206 to generate outputs based on inputs that are received via hardware interfaces and software user interfaces. For example, the operating system 212 may provide an execution environment for the execution of the applications 214. The operating system 212 may include a presentation component that presents the output (e.g., display the data on an electronic display, store the data in memory, transmit the data to another electronic device, etc.). The operating system 212 may include other components that perform various other functions generally associated with an operating system.

The applications 214 may include applications that provide utility, distractions, and/or productivity functionalities to a user of the in-vehicle information device 104. For example, the applications 214 may include telephony applications, electronic mail applications, remote desktop applications, web browser applications, navigation applications, media streaming applications, and/or so forth.

The in-vehicle information application 216 may include an interface selection module 218, an information module 220, an interactive interface module 222, a video module 224, and a data management module 226. These modules may include routines, program instructions, objects, and/or data structures that perform particular tasks or implement particular abstract data types. The memory 208 may also provide a data store 228.

The interface selection module 218 may generate an interface selection menu that is presented by the hardware interface 112 to the law enforcement officer 114. The interface selection menu may enable the law enforcement officer 114 to select specific user interfaces for presentation to the person 110. The selections may be inputted into the interface selection module 218 via the hardware interfaces 112. In turn, the interface selection module 218 may activate the information module 220 or the interactive interface module 222 based on the specific user interfaces selected for presentation. In some embodiments, the law enforcement officer 114 may make a selection by entering attributes of the person that is the audience of the user interface. In such embodiments, a user interface may be select by the law enforcement officer 114 to suit the demographic attributes of the person 110. For example, a user interface may be presented in a language other than English if the person 110 is unable to understand English. The user interface may have closed captioning text if the person is hearing impaired. The user interface may be further or independently tailored according to the age of the person 110. For example, a user interface may contain more in-depth explanations or use simplified terms if the person 110 is a juvenile rather than adult.

In additional embodiments, the law enforcement officer 114 may input other attributes to select an appropriate user interface. Alternatively or concurrently, the interface selection module 218 may provide user interfaces based on additional attributes that are received from the network operations center 120. These attributes, as are provided by the law enforcement officer 114 and/or the network operations center 120, may include reasons for which the law enforcement officer is interacting with the person, behavior of the person during the interaction, prior criminal or arrest record of the person, propensity for specific behaviors by the person, medical conditions of the person, and/or so forth.

The information module 220 may cause the display device 106 and/or the audio speakers 108 to present various information segments to the person 110. The information module 220 may receive a selection of an information segment that is initiated via the hardware interface 112 by the law enforcement officer 114. In turn, the information module 220 may present the selected information segment to the person 110. The information segments may be stored locally in the data store 228, or transmitted to the in-vehicle information device 104 from the servers 122 at the network operation center 120. The information segments may include video information that is presented via the display device 106 and/or audio information that is presented via the audio speakers 108. For example, if the person 110 is an arrested person, the information segment may inform the arrested person of the person's Miranda rights. In another example, the information segment may also provide information regard the destination detention facility and/or procedures at the destination detention facility. Other information segments may discuss topics that are directed to persons that are not under arrest. For example, information segments may include community service announcements, crime watch alerts and statistics, summaries of changes in policing policies, and/or so forth.

In some embodiments, the information module 220 may provide a user interface that enables the person 110 to select an information segment from a group of information segments. In such embodiments, the law enforcement officer 114 may select a group of information segments. In turn, the person 110 may use the user interface to select a particular information segment from the group. For example, the information module 220 may cause a touch screen display (e.g., the display device 106) to display an array of on-screen buttons, in which each button corresponds to language-specific version of an information segment on a particular topic. Accordingly, the person 110 may use on-screen buttons to select one language-specific version of the information segment. Alternatively or concurrently, the information module 220 may also display on-screen buttons that enable person 110 select adult or child versions of information segments on a topic.

The interactive interface module 222 may cause the display device 106 and/or the audio speakers 108 to present various interactive interfaces to the person 110. The information module 220 may receive a selection of an interactive segment that is initiated via the hardware interface 112 by the law enforcement officer 114. In turn, the information module 220 may present the selected interactive interface to the person 110. The interactive interfaces may include video information that is presented via the display device 106 and/or audio information that is presented via the audio speakers 108. The person 110 may provide inputs to the interactive interfaces via an input device, such as a touch screen.

In various instances, the interactive interfaces may include communication interfaces, interview interfaces, and survey interfaces. In order to facilitate the use of these interactive interface, the in-vehicle information device 104 may be equipped with a microphone, a keyboard, a touch screen, a gesture input device, a pointer device, speech recognition software, and/or so forth, in addition to the display device 106 and the audio speakers 108. The communication interfaces may enable the person 110 to initiate communication with third-parties via a telephony application, an email application, and/or a messaging application. In this way, the person 110 that is detained or arrested by the law enforcement officer 114 may be afforded an opportunity to contact an attorney or a relative.

The interview interfaces may enable the person 110 to provide his or her input with respect to incidents or events that caused the response of the law enforcement officer 114 to a scene. In one scenario, an interview interface may include a series of questionnaires that a witness to a specific crime (e.g., shoplifting) may answer. In this way, the law enforcement officer 114 may preserve the best evidence for use during the investigation or trial. In such an instance, the questionnaires may relate to the physical description of the alleged perpetrator, the description of the victim, the location of the witness, the weapon used, and/or so forth. In another scenario, an interview interface may include a series of questionnaires that an arrested person may answer after being informed of Miranda rights. The arrested person may be motivated to answer such questionnaires in order to clarify or dispute allegations against the person. For example, a person arrested for drunk driving may answer a series of questions regarding the number of drinks they had or provide other mitigating factors to demonstrate a lack of intoxication. In such scenarios, the interview interfaces may present the questionnaires in many forms, such as scale rating questions, multiple choice questions, true and false questions, essay questions, and/or so forth.

The interactive interface module 222 may store the responses to the questionnaires in the data store 228. In some embodiments, the interactive interface module 222 may use the data management module 226 to further tag the responses with the appropriate metadata. The metadata may include a timestamp that each response is given, a name and a badge number of the associated law enforcement officer, identification information of the person 110, an incident identifier, a case identifier, an event identifier, dispatch information, a location of the law enforcement vehicle, and/or so forth. The interactive interface module 222 may transmit the tagged responses to the network operations center 120 for storage and analysis.

The survey interfaces may enable the person 110 to provide feedback regarding the person's encounter with the law enforcement officer 114. For example, a survey interface may enable the person 110 to rate the various attributes of the law enforcement officer 114 during an encounter. Such attributes may include friendliness, professionalism, knowledgeability, fairness, and/or so forth. In another example, a survey interface may enable the person 110 to rate other general attributes. These attributes may include the response time of the law enforcement agency, perception of the law enforcement agency in the community, perception of the law enforcement agency in particular demographic groups, etc. The attributes may be rated using a fixed scale rating system. For instance, each rating may be a numerical rating that is based on a fixed scale (e.g., 3 out of 5 stars). However, other rating systems, such as a rating system that includes positive, neutral, or negative selections, may be used to rate the attributes. Accordingly, the survey interfaces may be equipped with graphical stars, sliders, radio buttons, checkboxes, etc. for making the appropriate rating selection. In some embodiments, the interactive interfaces may include commentary boxes for the person 110 to provide longer and more detailed feedback.

In other instances, the interactive interfaces may include distraction interfaces. The distraction interfaces are configured to provide content that distracts the person 110. In one instance, a distraction interface may present a list of games that the person 110 may play. For example, the person 110 may be child and the games may serve to occupy and distract the child. In another instance, a distraction interface may present a list of audio files (e.g., a list of songs) or a list of multimedia files (e.g., movies) that can be played via the distraction interface. Such content may be screened beforehand to ensure that they are not inappropriate or offensive. For example, movies that may be played through a distraction interface are rated "G". Likewise, songs that may be played through a distraction interface are free from explicit lyrics or violent themes. In some embodiments, the distraction interfaces may be grouped into adult interfaces and child-friendly interfaces, such that the content presented by the distraction interfaces are age appropriate.

The interactive interface module 222 may store the survey results in the data store 228. In some embodiments, the interactive interface module 222 may use the data management module 226 to further tag the survey results with the appropriate metadata. The metadata may include a timestamp that each survey result is given, a name and a badge number of the associated law enforcement officer, identification information of the person 110, dispatch information, a location of the law enforcement vehicle 102(1), an incident identifier, a case identifier, an event identifier, and/or so forth. The interactive interface module 222 may transmit the tagged survey results to the network operations center 120 for storage and analysis.

The video module 224 may use the cameras 116 to capture images or video footage of the person 110 in the secure holding area of the law enforcement vehicle 102(1). The cameras 116 may be strategically placed adjacent the secure holding area such that facial expressions or body movements of the person 110 is visible to at least one of the cameras 116 at all times. In some embodiments, the camera footage captured by the camera 116 may be supplemented by audio that is captured via microphones that monitor the secure holding area. In some embodiments, the law enforcement officer 114 may obtain the consent of the person 110 prior to capturing the video footage.

The video module 224 may analyzed the captured body movements, facial expressions, and/or audio expressions of a person, such as the persons 110, in order to detect suspicious behavior by the person. For example, the body movements or facial expressions of the person may indicate that the person is trying to hide or destroy evidence, break out of the secure holding area, preparing to attack the law enforcement officer 114, etc. In various embodiments, the video module 224 may include an analytic engine to perform the behavior analysis. The analytic engine may be trained using various approaches, such as supervised learning, unsupervised learning, semi-supervised learning, naïve Bayes, Bayesian networks, decision trees, neural networks, fuzzy logic models, and/or probabilistic classification models. Upon the detection of suspicious behavior, the video module 224 may generate a visual or audio warning to alert the law enforcement officer 114. The visual alert or audio alert may include programmed text or speech that describes the nature of the suspicious behavior. The video module 224 may store the capture images or footages in the data store 228. In some embodiments, the video module 224 may use the data management module 226 to further tag the captured images or footages with the appropriate metadata. The interactive interface module 222 may transmit the tagged images or footages to the network operations center 120 for storage and analysis. For example, in some instances, the network operations center 120 may include a video analyzer that performs similar function as the analytic engine of the video module 224.

In additional embodiments, the analysis data generated by the analytic engine of the video module 224 may be fed back to the interface selection module 218 such that the interface selection module 218 may select additional user interfaces or modify current user interfaces for display to the person. For example, upon the detection of suspicious behavior by the person, the interface selection module 218 may present an information segment informing the person that resisting arrest, assault a law enforcement officer, or attempting to escape custody are criminal acts that may result in additional legal charges.

The data management module 226 may be called upon by other modules to tag content, such as inputted responses and captured images, with metadata. In various embodiments, the metadata may include timestamps, a name and a badge number of the associated law enforcement officer, identification information of the person 110, an incident identifier, a case identifier, an event identifier, and/or so forth. In various embodiments, the data management module 226 may further tag content with metadata that is entered by the law enforcement officer 114 via the hardware interface 112. The various modules of the in-vehicle information application 216 may use an encryption algorithm to encrypt the data that are transmitted to the network operations center 120.

In various embodiments, the encryption may be symmetric encryption, asymmetric encryption, cipher encryption, and/or so forth. Alternatively or currently, the various modules of the in-vehicle information application 216 may use a message digest algorithm in conjunction with a shared secret to generate a verifiable digital signature for the data. In turn, the network operations center 120 may use the appropriate algorithms decrypt the data and/or verify the authenticity of the data to ensure that no tampering of the data occurred during transmission. In this way, proper chain of custody for the transmitted data may be maintained for evidentiary purposes.

The data store 228 may include one or more databases, such as relational databases, object databases, object-relational databases, and/or key-value databases that store data. In at least some embodiments, the data store 228 may store presentation data 230, interactive data 232, content 234, and metadata 236. The presentation data 230 may include the information segments that are presented by the information module 220. The interactive data 232 may include data that are used to generate the interactive interfaces that are presented by the interactive interface module 222. The content 234 may include data that are captured by the modules of the in-vehicle information application 216. Such data may include responses, survey results, images, data inputted by the law enforcement officer 114, and video footages. The metadata 236 may include metadata that are generated by the data management module 226 for the various content. Thus, the metadata 236 may be integrated with or correlated with the content 234 in the data store 228.

Example User Interfaces

Figure 3:
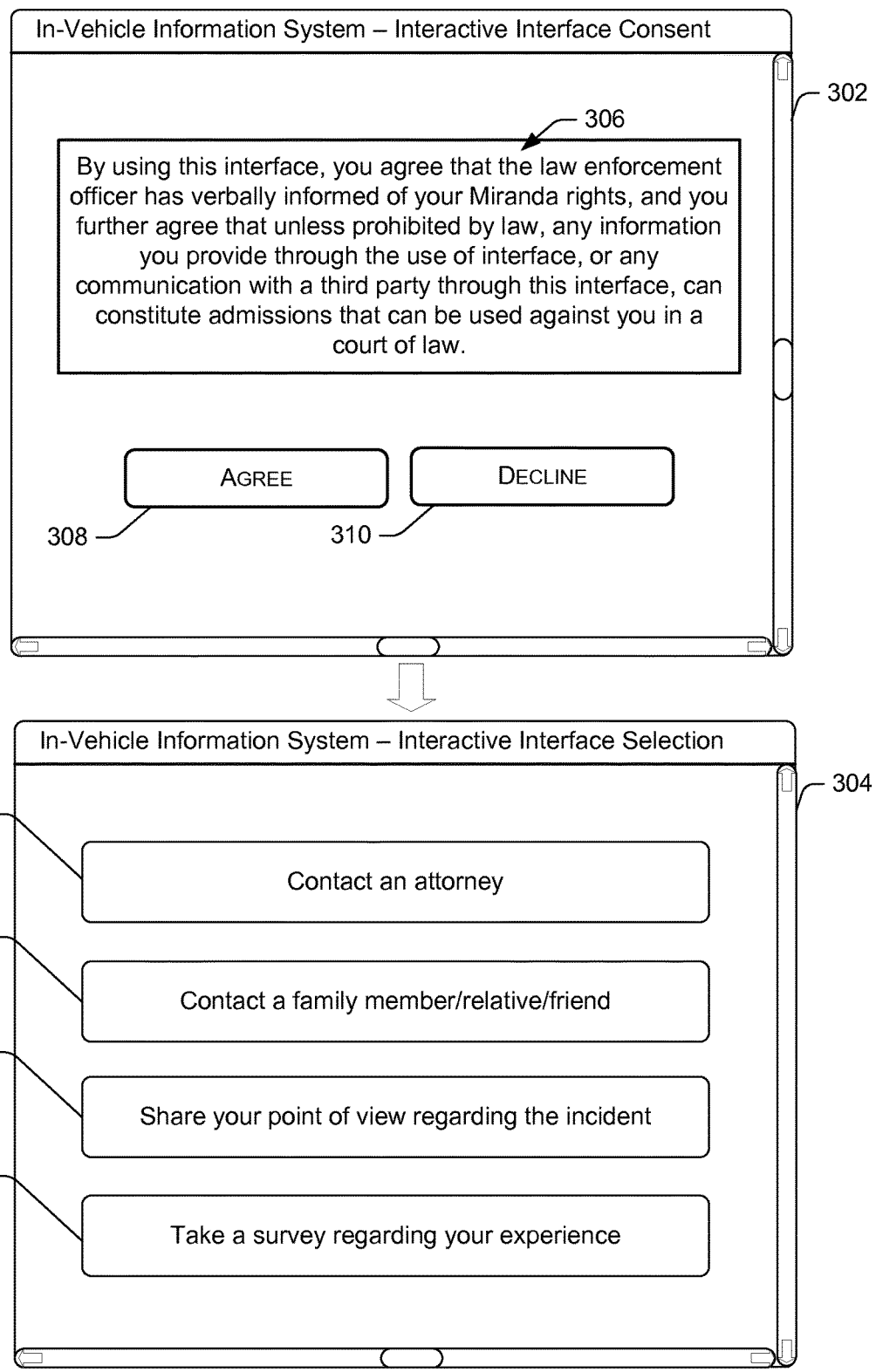
FIG. 3 shows illustrative law enforcement in-vehicle user interfaces that are provided by an in-vehicle information device.

FIG. 3 shows illustrative law enforcement in-vehicle user interfaces that are provided by an in-vehicle information device. The user interfaces 302 and 304 may be generated by the interactive interface module 222 of the in-vehicle information device 104. The user interface 302 may be presented by the interactive interface module 222 prior to the interactive interface module 222 making the user interface 304 available. The user interface 302 may include an information panel 306, an agree button b308, and a decline button 310. The information panel 306 may provide information regarding the legal rights, such as Miranda rights, of a person that is arrested or detained by the law enforcement officer 114. In some embodiments, the information panel 306 may also include a warning that any information that is provided to the in-vehicle information device 104 by a person through the use of the interactive interfaces may be legally used against the person in court. Accordingly, if the person activates the agree button 308 to signify that the person understands and agrees to the terms of usage, the interactive interface module 222 may present the user interface 304. However, if the person activates the decline button 310, the interactive interface module 222 may prevent the person from accessing any interactive interface menus, such as the user interface 304.

The user interface 304 may provide an interactive menu that enables the person to perform various tasks. In some embodiments, the interactive menu may include an attorney contact option 312, a third party contact option 314, an interview option 316, and a survey option 318. The activation of the attorney contact option 312 may cause the interactive interface module 222 to provide an interactive interface that contains a list of pre-screened attorneys and their contact information. The contact information may be selectable to initiate contact (e.g., a telephone number may be clicked on to initiate a telephone call). Accordingly, an arrested person may use a telephony application, an email application, or a messaging application that is built into the in-vehicle information device 104 to contact a selected attorney. In other instances, the interactive interface activated through the attorney contact option 312 may simply provide access to the telephony application, such that the person may contact an attorney of the person's choice. In various embodiments, the interactive interface module 222 may be configured cause the in-vehicle information device 104 to shut off all recording capabilities during the contact with the person's attorney, as per the person's legal rights. For example, the in-vehicle information device 104 may shut off cameras, microphones, email and messaging archival/monitoring applications, and/or so forth, during the duration of the contact.

However, the interactive interface module 222 may nevertheless record metadata regarding the call to the attorney, such metadata may include time and date of the contact with the attorney, duration of the contact, telephone number used for the contact, email address or message recipient address, and/or so forth. Such metadata may be useful in instances in which controversy arises with respect to whether the person's legal rights were violated.

The third party contact option 314 may be used by an arrested person to contact a family member, relative, or friend for emotional and logistical reasons. Accordingly, an arrested person may use a telephony application, an email application, or a messaging application that is built into the in-vehicle information device 104 to contact such people. However, unlike in the use of the attorney contact option 312, the interactive interface module 222 may not trigger the shut of the recording capabilities.

The interview option 316 may be used by an arrested person to access the interview interfaces provided by the interactive interface module 222. Accordingly, the interview interfaces may enable the person 110 to provide his or her input with respect to incidents or events that caused the response of the law enforcement officer 114 to a scene. The survey option 318 may be used by the arrested person to access the survey interfaces provided by the interactive interface module 222. The survey interfaces may enable the person 110 to provide feedback regarding the person's encounter with the law enforcement officer 114. However, once again, unlike in the use of the attorney contact option 312, the interactive interface module 222 may not trigger the shut of the recording capabilities when interactive interface are used through the interview option 316 and the survey option 318. In alternative embodiments, the interactive interface module 222 may provide the third party contact option 314, the interview option 316, and the survey option 318 for use by persons who are not under arrest. In such embodiments, the presentation of these options by the interactive interface module 222 is not preceded by the user interface 302.

Example Processes

Figure 4:
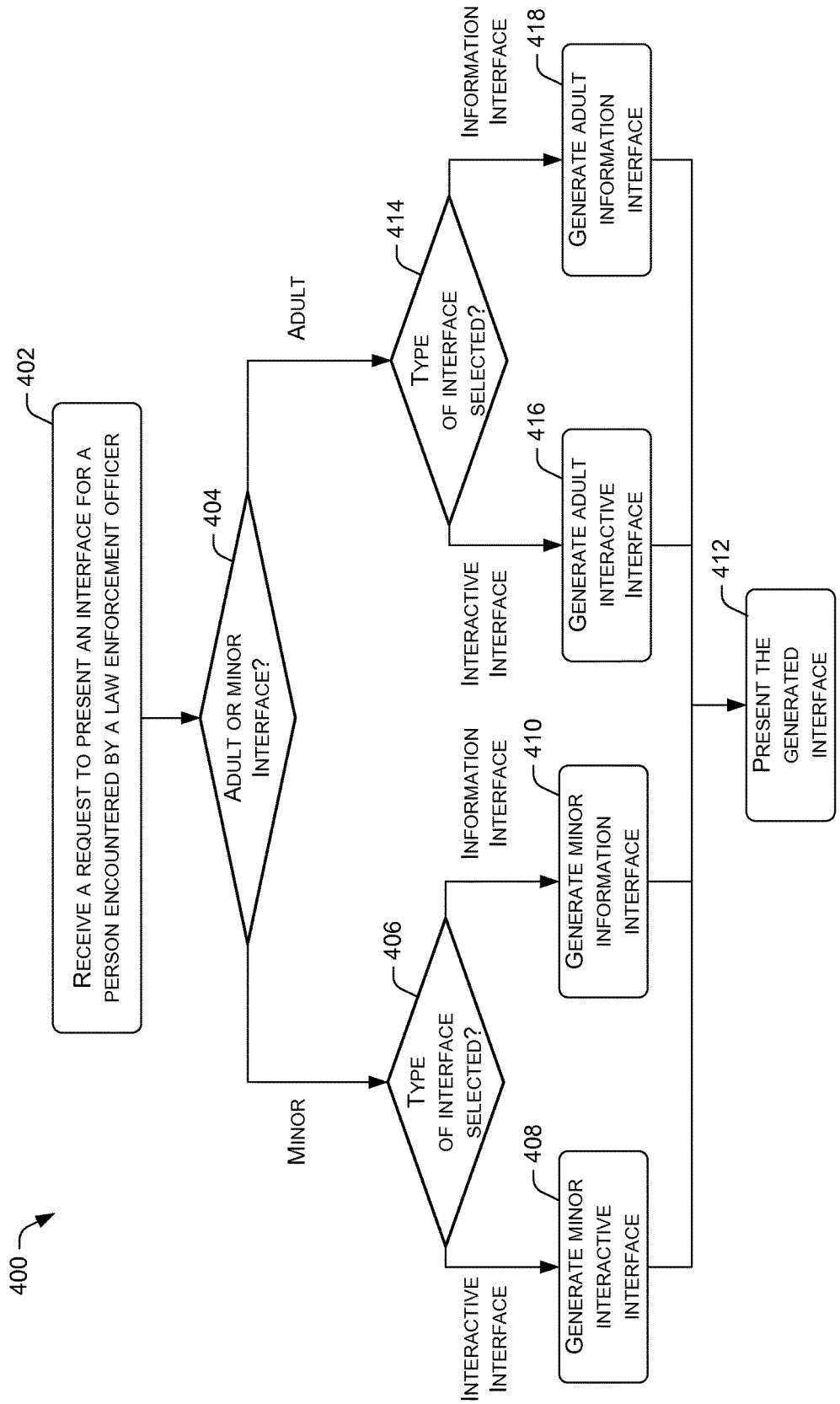
FIG. 4 is a flow diagram of an example process for presenting a designated in-vehicle law enforcement user interface to a person contacted by a law enforcement officer.
Figure 5:
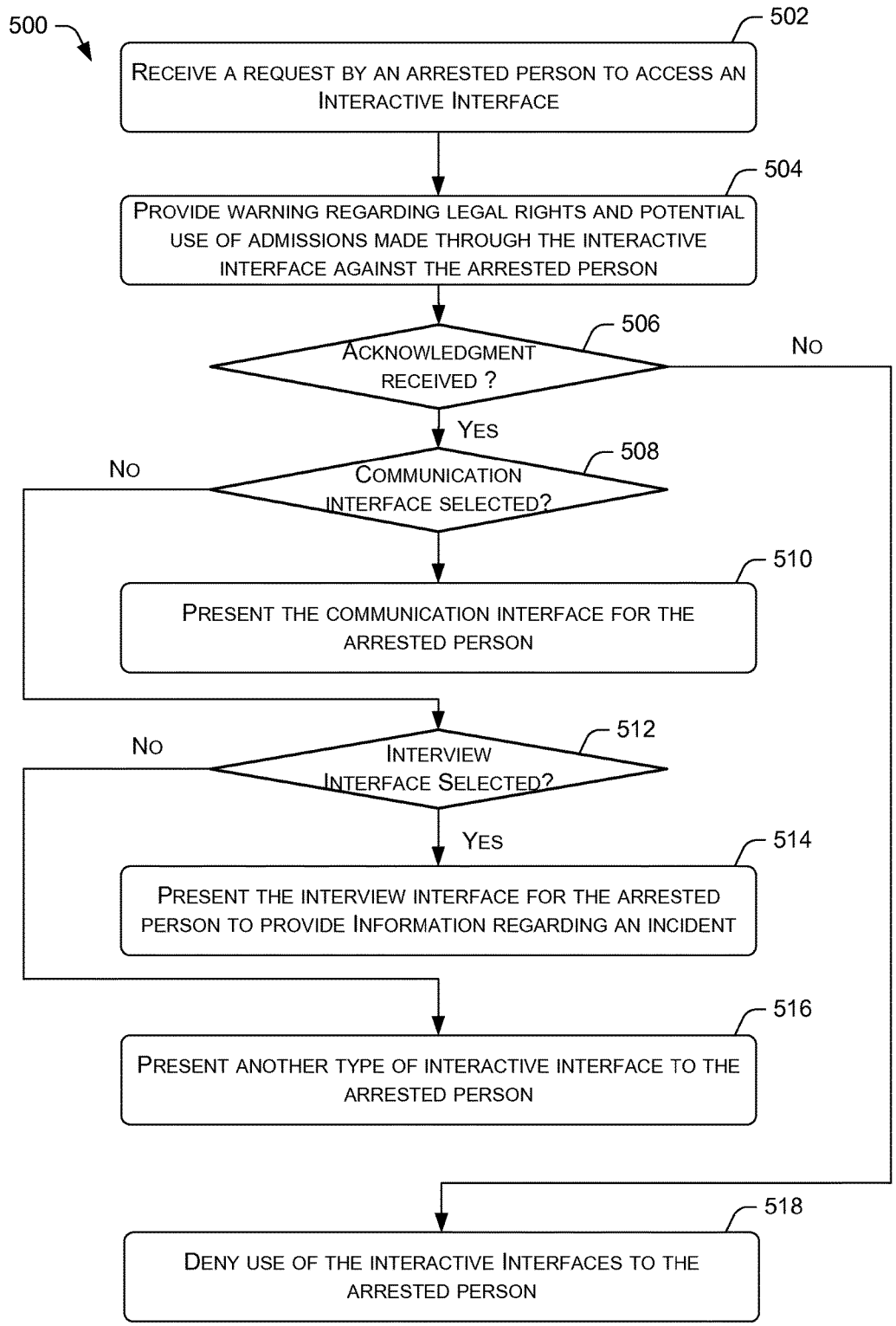
FIG. 5 is a flow diagram of an example process for presenting an in-vehicle law enforcement interactive interface to a person arrested by a law enforcement officer.
Figure 6:
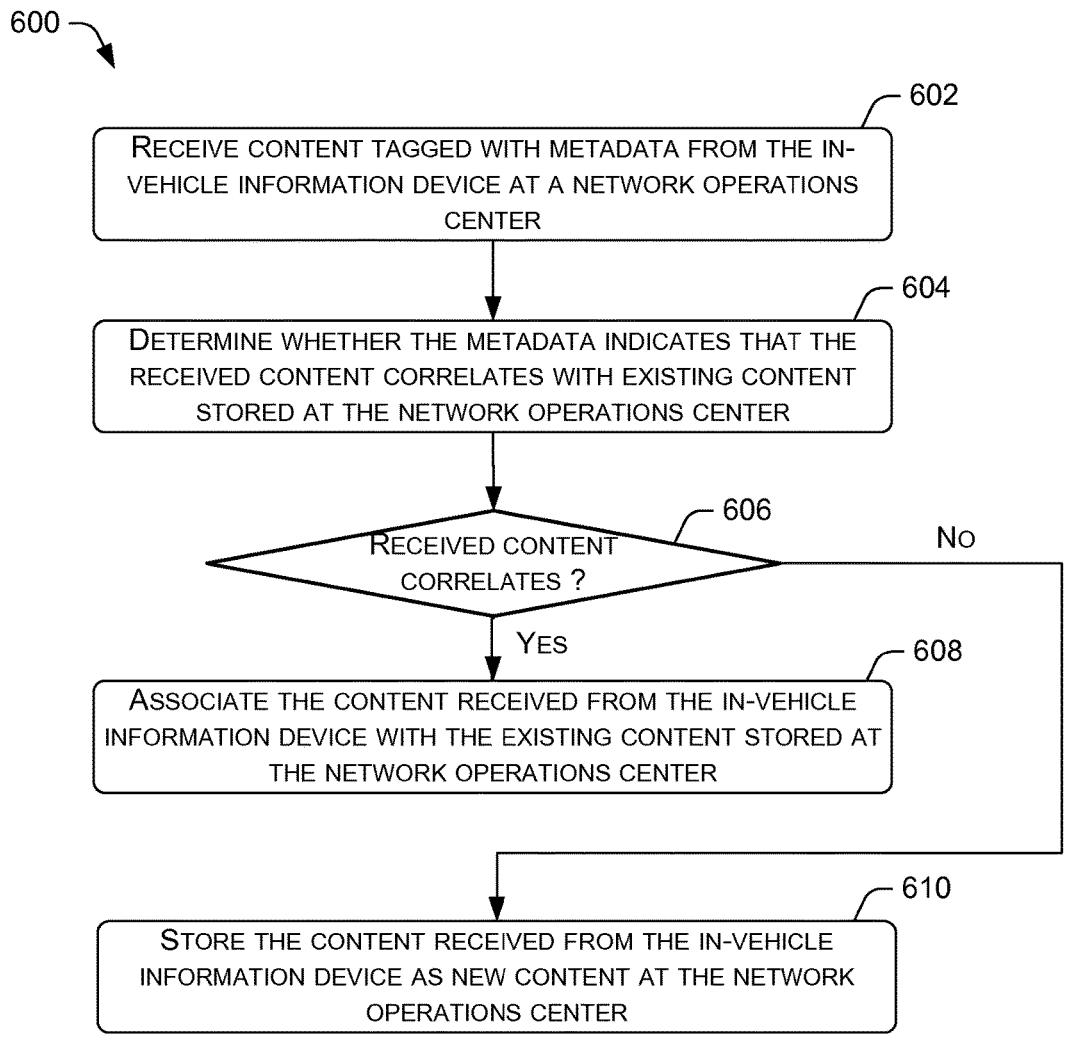
FIG. 6 is a flow diagram of an example process for storing content that is tagged with metadata at a network operations center.

FIGS. 4-6 present illustrative processes 400-600 for implementing law enforcement in-vehicle user interfaces. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an example process 400 for presenting a designated in-vehicle law enforcement user interface to a person contacted by a law enforcement officer. At block 402, the in-vehicle information device 104 may receive a request to present an interface for a person (e.g., person 110) that is encountered by a law enforcement officer, such as the law enforcement officer 114. The request may be initiated by the law enforcement officer using the hardware interface 112. The request may be for a specific form of interface that is selected by the law enforcement officer via an interface selection menu.

At decision block 404, the in-vehicle information device 104 may select the appropriate user interface for presentation based on the request. In various embodiments, the in-vehicle information device 104 may select the appropriate user interface based on contextual information supplied by the law enforcement officer or contextual information provided by a dispatch network operations center that dispatched the law enforcement officer. Such contextual information may include reasons for which the law enforcement officer is interacting with the person, behavior of the person during the interaction, an age of the person, prior criminal or arrest record of the person, propensity for specific behaviors by the person, medical conditions of the person, and/or so forth. In some instances, the contextual information may also include analysis data provided by an analytic engine that is analyzing video footages of the behaviors of the person. Thus, if the selected interface is for a minor (e.g., a person under the age of 16), the process 400 may proceed to decision block 406. At decision block 406, the in-vehicle information device 104 may determine whether the requested interface is an interactive interface or an information interface. Thus, if the selected interface is an interactive interface, the process 400 may proceed to block 408. At block 408, the in-vehicle information device 104 may generate an interactive interface for a minor. For example, the interactive interface may be a distraction interface, a survey interface, or a third party contact interface, in which the presentation style, presentation format, presentation content, and/or presentation language differ from their adult counterparts, i.e., more child friendly. At block 410, the in-vehicle information device 104 may present the generated interface. In various embodiments, the generated interface may be presented via the display device 106, the audio speakers 108, and/or other presentation devices.

Returning to decision block 406, if the selected interface is an information interface, the process 400 may proceed to block 412. At block 412, the in-vehicle information device 104 may generate an information interface for a minor, in which the presentation style, presentation format, presentation content, and/or presentation language differ from their adult counterparts, i.e., more child friendly. Subsequently, the process 400 may once again proceed to block 410.

Returning to decision block 404, if the type of user interface selected is for an adult, the process 400 may proceed to decision block 414. At decision block 414, the in-vehicle information device 104 may determine whether the requested interface is an interactive interface or an information interface. Thus, if the selected interface is an interactive interface, the process 400 may proceed to block 416. At block 416, the in-vehicle information device 104 may generate an interactive interface for an adult. For example, the interactive interface may be a distraction interface, an attorney contact interface, a survey interface, or a third party contact interface. Subsequently, the process 400 may once again proceed to block 410.

Returning to decision block 414, if the selected interface is an information interface, the process 400 may proceed to block 418. At block 418, the in-vehicle information device 104 may generate an information interface for an adult. Subsequently, the process 400 may once again proceed to block 410.

FIG. 5 is a flow diagram of an example process 500 for presenting an in-vehicle law enforcement interactive interface to a person arrested by a law enforcement officer. At block 502, the in-vehicle information device 104 may receive a request by an arrested person to access an interactive interface. At block 504, the in-vehicle information device 104 may provide an interactive warning interface. The interactive warning interface may present a notice regarding legal rights and potential use of admissions made through the interactive interface against the arrested person in court. The interactive warning interface may include options for the arrested person to either acknowledge the notice or decline the notice.

At decision block 506, the in-vehicle information device 104 may determine whether an acknowledgment of the notice is received. If an acknowledgement of the notice is received ("yes" at decision block 506), the process 500 may proceed to decision block 508. At decision block 508, the in-vehicle information device 104 may determine whether a communication interface is selected by the arrested person. The communication interface may be an interface for contacting an attorney or contact a third party (e.g., a relative of the arrested person). Thus, if the in-vehicle information device 104 determines that a communication interface is selected ("yes" at decision block 508), the process 500 may proceed to block 510. At block 510, the in-vehicle information device 104 may present the communication interface to the arrested person. However, if the in-vehicle information device 104 determines that no communication interface is selected ("no" at decision block 508), the process may proceed to decision block 512.

At decision block 512, the in-vehicle information device 104 may determine whether an interview interface is selected by the arrested person. The interview interface may enable the arrested person to provide his or her input with respect to incidents or events that caused the response of the law enforcement officer to an associated scene. Thus, if the in-vehicle information device 104 determines that a communication interface is selected ("yes" at decision block 512), the process 500 may proceed to block 514. At block 514, the in-vehicle information device 104 may present the interview interface to the arrested person. However, if the in-vehicle information device 104 determines that no interview interface is selected ("no" at decision block 512), the process may proceed to block 516. At block 516, the in-vehicle information device 104 may present another interactive interface to the arrested person. For example, the interactive interface may be a survey interface, a distraction interface, and/or so forth. However, in some embodiments, the distraction interface may be displayed by the in-vehicle information device 104 without the acknowledgement of the notice presented by the interactive warning interface.

Returning to decision block 506, if no acknowledgement of the notice is received ("no" at decision block 506), the process 500 may proceed to block 518. At block 518, in-vehicle information device 104 may prevent the use of the interactive interfaces by the arrested person.

FIG. 6 is a flow diagram of an example process 600 for storing content that is tagged with metadata at a network operations center. At block 602, the servers 122 of the network operations center 120 may receive content tagged with metadata from the in-vehicle information device 104. The servers 122 may receive the tagged content via the network 126. The tagged content may be camera footage captured by the cameras, information supplied by persons using the interactive interfaces, and/or information supplied to the in-vehicle information device 104 by a law enforcement officer. The servers 122 may use algorithms, encryption keys, and shared secrets to decrypt and/or verify the authenticity of the received content and the metadata.

At block 604, a content management engine 132 on the servers 122 may determine whether the metadata indicates that the received content correlates with existing content stored at the servers 122 of the network operations center 120. The received content may correlate with existing content when they pertain to the same incident, the same case, the same event, and/or are from an identical or overlapping time period. Thus, at decision block 606, if the content management engine 132 determines that the received content correlates with the existing content stored in the servers 122 ("yes" at decision block 606), the process 600 may proceed to block 608.

At block 608, the content management engine 132 may associate the content received from the in-vehicle information device with the existing content stored at the servers 122 of the network operations center 120. However, if the content management engine 132 determines that the received content does not correlate with the existing content stored in the servers 122 ("no" at decision block 606), the process 600 may proceed to block 610. At block 610, the content management engine 132 may store the content received from the in-vehicle information device 105 as new content at the servers 122 of the network operations center 120.

The techniques may enable a law enforcement officer to communicate information to and obtain feedback from a person that is held in a secure holding area of a law enforcement vehicle. The information may be used to alleviate the anxiety or fear of a person that is detained or arrested. The techniques may also enable a law enforcement officer to provide distractions that calms individuals being contacted by the law enforcement officer. Accordingly, the in-vehicle user interfaces may be used by law enforcement officers to foster trust, increase public safety, and improve relations with community members.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   receiving, at a computing device in a law enforcement vehicle, a request to present a user interface to a person in a secure holding area of the law enforcement vehicle;
   generating, via the computing device in the law enforcement vehicle, the user interface for the person based on the request, the generating being performed based on contextual information from at least one of an input provided to the computing device by a law enforcement officer, an input received from a network operations center, or an input obtained from an analysis of images or video footages from a camera in the law enforcement vehicle; and
   causing, via the computing device in the law enforcement vehicle, a presentation of the user interface to the person in the secure holding area of the law enforcement vehicle;
   wherein the user interface is an information interface that provides the person with information regarding legal rights of the person, a destination detention facility of the person, or procedures at the destination detention facility.

2. The computer-implemented method of claim 1, wherein the images or the video footages from the camera in the law enforcement vehicle capture at least one of body movements or facial expressions of the person, further comprising:
   analyzing the at least one of the body movements or the facial expressions of the person to detect suspicious behavior; and
   producing at least one of an audio alert or a visual alert of the suspicious behavior by the person at the law enforcement vehicle.

3. The computer-implemented method of claim 2, wherein the analyzing is performed at the computing device in the law enforcement vehicle or at a server of a network operations center.

4. The computer-implemented method of claim 1, wherein the receiving includes receiving the request to present the user interface from a law enforcement officer operating the law enforcement vehicle.

5. The computer-implemented method of claim 1, wherein the user interface is an interactive interface, further comprising:
   receiving an input from the person in the secure holding area of the law enforcement vehicle via the interactive interface;
   tagging the input with metadata that include at least one of dispatch information, a vehicle location, a timestamp, an incident identifier, an event identifier, or a case identifier; and
   sending the input and the metadata to a server of a network operations center for storage as new content or for associating the input with existing content based at least on the metadata.

6. The computer-implemented method of claim 1, wherein the user interface is an interactive communication interface that enables the person to contact an attorney or another third party, an interactive interview interface the enables the person to provide input with respect to an incident or event that caused a response of the law enforcement officer, or an interactive survey interface that enables the person to provide feedback regarding an interaction of the person with the law enforcement officer.

7. The computer-implemented method of claim 6, wherein the causing the presentation includes causing the presentation of the user interface in response to determining that the person has acknowledged a warning that information inputted into the user interface by the person is potentially an admission that is capable of being used against the person in a court of law.

8. The computer-implemented method of claim 6, wherein the causing the presentation includes causing the presentation of the user interface in response to determining that the person has acknowledged that the person has been informed of Miranda rights.

9. The computer-implemented method of claim 1, further comprising causing, via the computing device in the law enforcement vehicle, an additional presentation of an interactive distraction interface that provides a game, an audio presentation, a video presentation, or a multimedia presentation to the person.

10. One or more computer-readable media storing computer-executable instructions that upon execution cause one or more processors to perform acts comprising:
   receiving, at a computing device in a law enforcement vehicle, a request to present a user interface to a person in a secure holding area of the law enforcement vehicle;
   generating, via the computing device in the law enforcement vehicle, the user interface for the person based on the request, the generating being performed based on contextual information from at least one of an input provided to the computing device by a law enforcement officer, an input received from a network operations center, or an input obtained from an analysis of images or video footages from a camera in the law enforcement vehicle; and
   causing, via the computing device in the law enforcement vehicle, a presentation of the user interface to the person in the secure holding area of the law enforcement vehicle in response to determining that the person has acknowledged a warning that information inputted into the user interface by the person is potentially an admission that is capable of being used against the person in a court of law,
   wherein the user interface is an interactive communication interface that enables the person to contact an attorney or another third party, an interactive interview interface the enables the person to provide input with respect to an incident or event that caused a response of the law enforcement officer, or an interactive survey interface that enables the person to provide feedback regarding an interaction of the person with the law enforcement officer.

11. The one or more computer-readable media of claim 10, wherein the images or the video footages from the camera in the law enforcement vehicle capture at least one of body movements or facial expressions of the person, further comprising:
   analyzing the at least one of the body movements or the facial expressions of the person to detect suspicious behavior; and
   producing at least one of an audio alert or a visual alert of the suspicious behavior by the person at the law enforcement vehicle.

12. The one or more computer-readable media of claim 10, wherein the analyzing is performed at the computing device in the law enforcement vehicle or at a server of a network operations center.

13. The one or more computer-readable media of claim 10, wherein the receiving includes receiving the request to present the user interface from a law enforcement officer operating the law enforcement vehicle.

14. The one or more computer-readable media of claim 10, wherein the user interface is an interactive interface, further comprising:
   receiving an input from the person in the secure holding area of the law enforcement vehicle via the interactive interface;
   tagging the input with metadata that include at least one of dispatch information, a vehicle location, a timestamp, an incident identifier, an event identifier, or a case identifier; and
   sending the input and the metadata to a server of a network operations center for storage as new content or for associating the input with existing content based at least on the metadata.

15. A computing device in a law enforcement vehicle, comprising:
   one or more processors; and
   memory having instructions stored therein, the instructions, when executed by the one or more processors, cause the one or more processors to perform acts comprising:
      receiving a request to present a user interface to a person in a secure holding area of the law enforcement vehicle;
      generating the user interface for the person based on the request, the generating being performed based on contextual information from at least one of an input provided to the computing device by a law enforcement officer, an input received from a network operations center, or an input obtained from an analysis of images or video footages from a camera in the law enforcement vehicle; and
      causing a presentation of the user interface to the person in the secure holding area of the law enforcement vehicle in response to to determining that the person has acknowledged that the person has been informed of Miranda rights,
      wherein the user interface is an interactive communication interface that enables the person to contact an attorney or another third party, an interactive interview interface the enables the person to provide input with respect to an incident or event that caused a response of the law enforcement officer, or an interactive survey interface that enables the person to provide feedback regarding an interaction of the person with the law enforcement officer.

16. The computing device of claim 15, wherein the images or the video footages from the camera in the law enforcement vehicle capture at least one of body movements or facial expressions of the person, further comprising:
   analyzing the at least one of the body movements or the facial expressions of the person to detect suspicious behavior; and
   producing at least one of an audio alert or a visual alert of the suspicious behavior by the person at the law enforcement vehicle.

17. The computing device of claim 15, wherein the analyzing is performed at the computing device in the law enforcement vehicle or at a server of a network operations center.

18. The computing device of claim 15, wherein the receiving includes receiving the request to present the user interface from a law enforcement officer operating the law enforcement vehicle.

19. The computing device of claim 15, wherein the user interface is an interactive interface, further comprising:

receiving an input from the person in the secure holding area of the law enforcement vehicle via the interactive interface;
tagging the input with metadata that include at least one of dispatch information, a vehicle location, a timestamp, an incident identifier, an event identifier, or a case identifier; and
sending the input and the metadata to a server of a network operations center for storage as new content or for associating the input with existing content based at least on the metadata.

20. The computing device of claim 15, wherein the actions further comprise causing an additional presentation of an interactive distraction interface that provides a game, an audio presentation, a video presentation, or a multimedia presentation to the person.

\* \* \* \* \*